US007173646B2

(12) United States Patent
Nakahata

(10) Patent No.: US 7,173,646 B2
(45) Date of Patent: Feb. 6, 2007

(54) COLOR IMAGE FORMING APPARATUS

(75) Inventor: Hiroshi Nakahata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 10/508,796

(22) PCT Filed: Mar. 25, 2003

(86) PCT No.: PCT/JP03/03617

§ 371 (c)(1),
(2), (4) Date: Sep. 21, 2004

(87) PCT Pub. No.: WO03/083583

PCT Pub. Date: Oct. 9, 2003

(65) Prior Publication Data

US 2005/0157163 A1 Jul. 21, 2005

(30) Foreign Application Priority Data

Mar. 28, 2002 (JP) ............................ 2002-091229

(51) Int. Cl.
*G03G 21/00* (2006.01)
*B41J 2/435* (2006.01)
*G02B 26/10* (2006.01)

(52) U.S. Cl. ........................................ 347/245; 399/98

(58) Field of Classification Search ................. 399/98, 399/99

See application file for complete search history.

(56) References Cited

U.S. PATENT DOCUMENTS 6,271,869 B1 8/2001 Tada et al. .................. 347/116
6,308,024 B1 10/2001 Nakayama et al. ........... 399/98

FOREIGN PATENT DOCUMENTS

| | | | |
|---|---|---|---|
| EP | 0 734 154 A2 | | 9/1996 |
| JP | 3-200166 | | 9/1991 |
| JP | 8-22174 | | 1/1996 |
| JP | 2000-190562 | * | 7/2000 |
| JP | 2000-321517 | * | 11/2000 |
| JP | 2001-138574 | | 5/2001 |

OTHER PUBLICATIONS

Patent Abstracts of Japan, Publication No. 8-22174, Jan. 23, 1996.

* cited by examiner

*Primary Examiner*—Huan Tran
(74) *Attorney, Agent, or Firm*—Fitzpatrick, Cella, Harper & Scinto

(57) ABSTRACT

An image forming apparatus includes a plurality of image forming portions, each of which has a photosensitive member and a developing device for developing an electrostatic image on the photosensitive member, and an exposure unit disposed beneath the image forming portions for exposing the plurality of photosensitive members. The exposure unit has a frame member that accommodates an optical member. The frame member includes an upper frame portion opposed to the image forming portions. The upper frame portion has a plurality of recessed portions corresponding to the image forming portions respectively.

5 Claims, 6 Drawing Sheets

COLOR IMAGE FORMING APPARATUS

TECHNICAL FIELD

The present invention relates to an image forming apparatus such as a copying machine or a printer that uses an electrophotographic process, and particularly relates to a full color image forming apparatus that has a plurality of image forming portions.

BACKGROUND ART

Recently, so-called tandem type image forming apparatus having a plurality of image forming portions have been put into practical use in order to increase printing speed.

FIGS. 5 to 7 show an example of such a tandem type full color image forming apparatus, which constitutes a background of the present invention.

FIG. 5 is a cross sectional view of the apparatus. The apparatus shown in FIG. 5 is provided with photosensitive drums 20 for respective colors of yellow, magenta, cyan and black. Each photosensitive drum 20 is composed of an electrically conductive member coated with a photosensitive layer, on which an electrostatic latent image is to be formed by a laser beam emitted from a scanning type optical device. Reference numeral 21 designates the scanning type optical device that emits a laser beam based on image information sent from an image reading apparatus or a personal computer etc. (none of which is shown in the drawings), reference numeral 22 designates a developing device for forming a toner image on the photosensitive drum with triboelectrically charged toner, reference numeral 23 designates an intermediate transfer belt for transferring the toner image on the photosensitive drum onto a transferring sheet, reference numeral 24 designates a feed cassette that accommodates paper sheets on which toner images are to be formed, reference numeral 25 designates a fixing device for causing the toner image having been transferred on the sheet to adhere to it with heat, and reference numeral 26 designates a delivery tray on which the transferring sheet on which the image has been fixed is to be stacked.

In the following, the image forming process will be described.

A laser beam emitted from the scanning type optical device 21 in accordance with certain image information is radiated onto the photosensitive drum 20, so that an electrostatic latent image is formed on the photosensitive drum 20, which has been charged by a charger 27. Then in the developing device 22, triboelectically charged toner is applied to the electrostatic latent image, so that a toner image is formed on the photosensitive drum. The toner image is transferred from the surface of the photosensitive drum onto the intermediate transfer belt 23. The toner image is then further transferred from the intermediate transfer belt 23 onto a paper sheet having been transported from the feed cassette 24 provided in the lower portion of the apparatus main body. Thus, an image is formed on the paper sheet. The image formed on the paper sheet is fixed (i.e. subject to toner fixing) by the fixing device 25, and the sheet is delivered to be stacked onto the delivery tray.

FIG. 6 is a diagrammatic sketch showing an image forming portion that constitutes a part of the image forming apparatus shown in FIG. 5. The scanning type optical device shown in FIG. 6 forms an electrostatic latent image on the photosensitive drum by means of a polygon mirror 29 for deflecting the laser beam, which is emitted based on image information, in a scanning manner, f? lenses 30_a_ and 30_b_ for enabling constant speed scanning with the laser beam and for imaging the laser beam as a spot on the photosensitive drum, and a turn-back mirror 31 for reflecting the beam toward a predetermined direction. The scanning type optical device is vulnerable to dust and soil, and if some part in the optical path of the laser beam is soiled or contaminated, problems such as an image defect at the portion of an image that corresponds to the soil or insufficiency in toner at the portion of the image. In view of such problems, Moltopren (trademark) has been used to provide a sealing between an optics case 33 that accommodates optical parts and a top lid 34 as a countermeasure against entrance of dust. On the other hand, with the downsizing of the image forming apparatus main body, the location of the scanning type optical device has been made closer to the photosensitive drum. In addition, in the apparatus of this example, constituent parts are so arranged that the scanning type optical device is disposed below the drums in order to facilitate maintenance of portions in the circumference of the photosensitive members.

However, in the case in which the laser beams are radiated from beneath the photosensitive drums or in the case in which the laser beams are radiated from positions close to the photosensitive drums, toner scatters or drops from the developing device, the photosensitive drums or a cleaner etc. in the directions indicated by arrows in FIG. 6, as the apparatus is used.

In view of this, it is necessary to provide dust-proof glass plates 32 at laser beam emitting portions, as shown in FIG. 7, in order to prevent entrance of dust into the interior of the optics case and to prevent contamination of the optical parts.

However, in the image forming apparatus in which the optics case is disposed beneath the apparatus as described above, no countermeasure against contamination of the dust-proof glass plate 32 with dust or toner has been taken, though contamination of the optical elements accommodated in the optics case with dropping toner can be prevented from occurring. Therefore, as shown in FIG. 7, falling toner would slip down on the top surface of the optics case to eventually contaminate the surface of the dust-proof glass plate 32 over time. Such contamination would block the laser beam partially to prevent formation of the electrostatic latent image on the photosensitive drum, which would result in generation of a defective image.

DISCLOSURE OF THE INVENTION

An object of the present invention is to provide an image forming apparatus in which an exposure unit is disposed beneath a photosensitive member.

It is another object of the invention to provide an image forming apparatus in which image exposure is not affected by toner even if toner scattering occurs.

It is further object of the present invention to provide an image forming apparatus comprising:

a plurality of image forming portions, each image forming portion having a photosensitive member and a developing device for developing an electrostatic image on the photosensitive member; and an exposure unit disposed beneath the image forming portions for exposing the plurality of photosensitive members, the exposure unit having a frame member that accommodates an optical member, wherein the frame member includes an upper frame portion opposed to the image forming portions, the upper frame portion having a plurality of recessed portions corresponding to the image forming portions respectively.

Other objects of the present invention will become apparent from the following detailed descriptions.

BEST MODE FOR CARRYING OUT THE INVENTION

In the following, preferred embodiments of the present invention will be specifically described for an explanatory purpose. It should be noted, however, the dimensions, materials, shapes and relative arrangements of components described in connection with these embodiments are not intended to restrict the present invention, except as otherwise stated specifically.

(First Embodiment)

Figure 1:
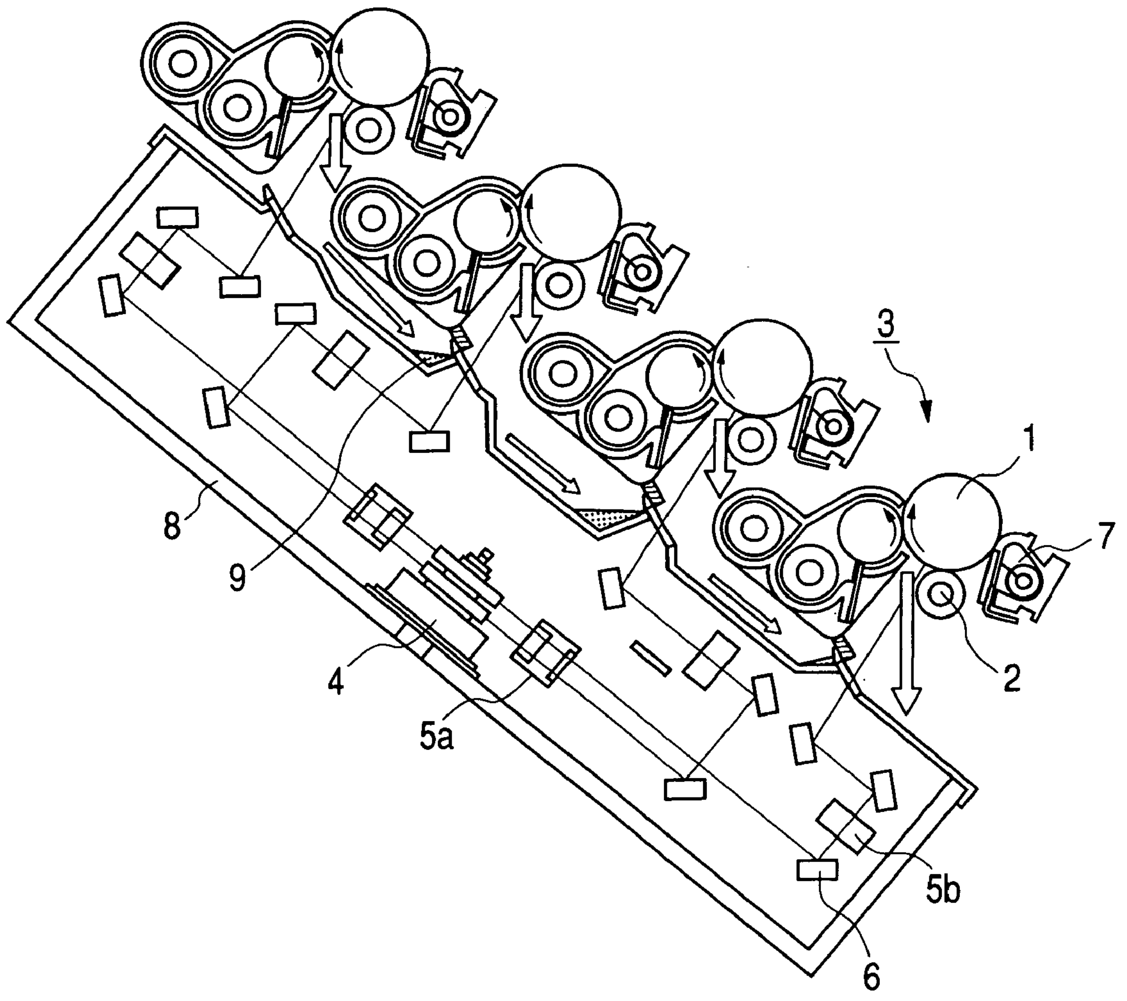
FIG. 1 is a schematic diagram showing an image forming apparatus according to a first embodiment of the present invention.
Figure 2:
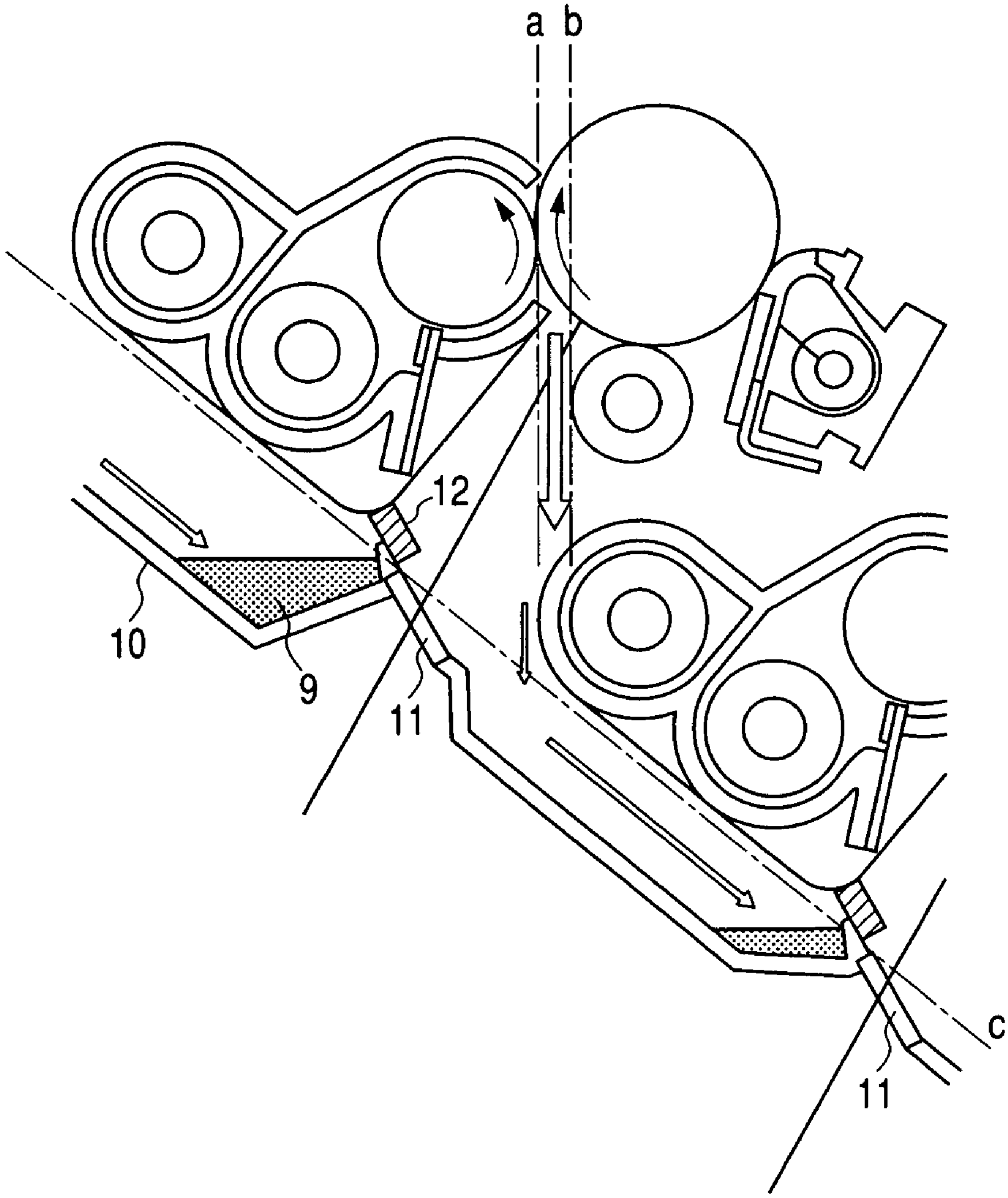
FIG. 2 is a schematic diagram showing an image forming portion in the first embodiment.

FIG. 1 shows a scanning type optical device and an image forming portion including photosensitive drums etc. according to a first embodiment of the present invention. In FIG. 1, reference numeral 1 designates a photosensitive drum (i.e. a photosensitive member as an image bearing member) composed of an electrically conductive member coated with a photosensitive layer, reference numeral 2 designates a charger for charging the photosensitive drum 1 up to a predetermined electric potential, reference numeral 3 designates a developing device for forming an image with toner on an electrostatic latent image, reference numeral 4 designates a polygon mirror for deflecting an emitted laser beam in a scanning manner, reference numerals 5*a* and 5*b* designate fθ lenses for enabling constant speed scanning with the laser beam and for imaging the laser beam as a spot on the photosensitive drum, reference numeral 6 designates a turn-back mirror for reflecting the beam toward a predetermined direction, reference numeral 7 designates a cleaner for cleaning toner remaining on the photosensitive drum, and reference numeral 8 designates an optics case (a frame member) that accommodates the optical elements of the scanning type optical device. In addition, what is designated by reference numeral 9 is toner that has scattered or dropped from parts such as the photosensitive drum or the cleaner. The thick arrows in FIG. 1 indicate the directions of fall of toner that drops from the developing device 3, the photosensitive drum 1 and the cleaner 7 etc. The optical path, which passes through a dust-proof glass plate (or a dust-proof window) 11, of the laser beam incident on the photosensitive drum 1 is arranged outside the space defined between the vertical plane (designated by letter "a") at the open end of the frame of the developing device for covering a developing roller that faces the photosensitive drum and the vertical tangential plane (designated by letter "b") of the charging roller. The toner dropping from parts such as the developing device 3, photosensitive drum 1 and the cleaner 7 falls on an optics case top lid 10 that covers over the optics case 8 of the scanning type optical device that is disposed beneath. The toner having fallen on the optics case top lid 10 gradually accumulates thereon, and eventually slips down on the surface of the optics case top lid 10.

In this embodiment, the optics case top lid 10 is formed in such a shape that the optics case top lid 10 is placed below a plane "c" that includes edges of adjoining dust-proof glass plates 11, so that there is provided toner pool portions (i.e. recessed portions) 9 that can receive a certain amount of toner that has slipped down. In addition, in order to prevent contamination of the dust-proof glass plates 11 by the scattering of the accumulated toner caused by slight airflow or some mechanical shock within the apparatus, Moltopren 12 is provided at the gaps between the optics case top lid 10 and the upper units such as the developing devices 3 to stop the gaps. With the above-described structure, the dust-proof glass plates 11 are difficult to be contaminated by fallen toner, and therefore image quality would be kept high. In addition, maintenance operations can be omitted or simplified.

(Second Embodiment)

In the following, a second embodiment of the invention will be described focusing mainly on features that are different from the first embodiment described above. In the second embodiment, components that have the same structure and function as those in the first embodiment will be designated by the same reference numerals as in the first embodiment and descriptions thereof, which would be redundant, will be omitted.

Figure 3:
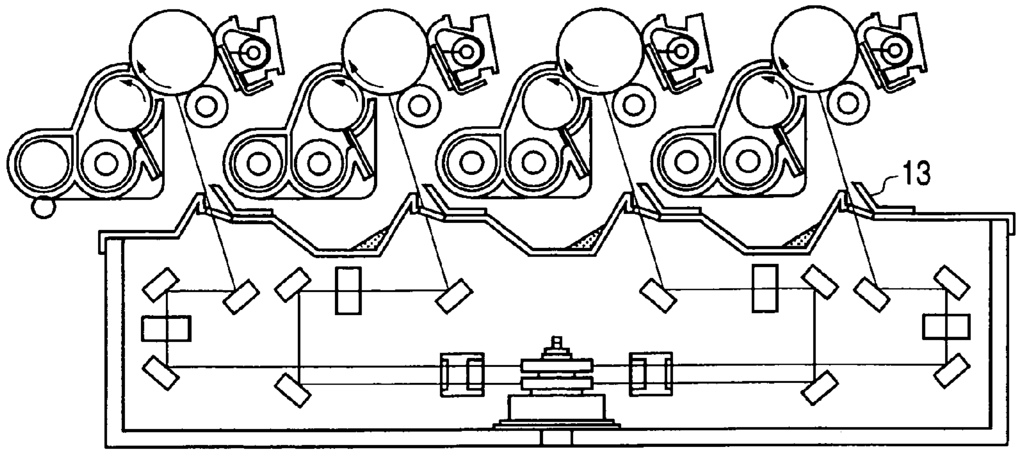
FIG. 3 is a schematic diagram showing an image forming apparatus according to a second embodiment of the present invention.

FIG. 3 shows a scanning type optical device and an image forming portion including photosensitive drums etc. in the second embodiment of the present invention.

On the optics case top lid 10 of the scanning type optical device that is disposed horizontally, a protecting cover 13 is provided in such a manner as to nearly cover each dust-proof glass plate 11, while leaving an area required for allowing irradiation of a laser beam onto a photosensitive drum 1. The dust-proof glass plate 11 is provided outside the space defined between the vertical plane at the open end of a developing device frame covering a developing roller that faces the photosensitive drum and the vertical tangential plane of a charging roller. The protecting cover 13 is provided for preventing the dust-proof glass plate 11 from being contaminated by toner dropping from upper structures such as developing device 3 disposed on the right side of the protecting cover 13 as shown in FIG. 3 and by toner scattering (or flying) in the interior of the apparatus.

Figure 4:
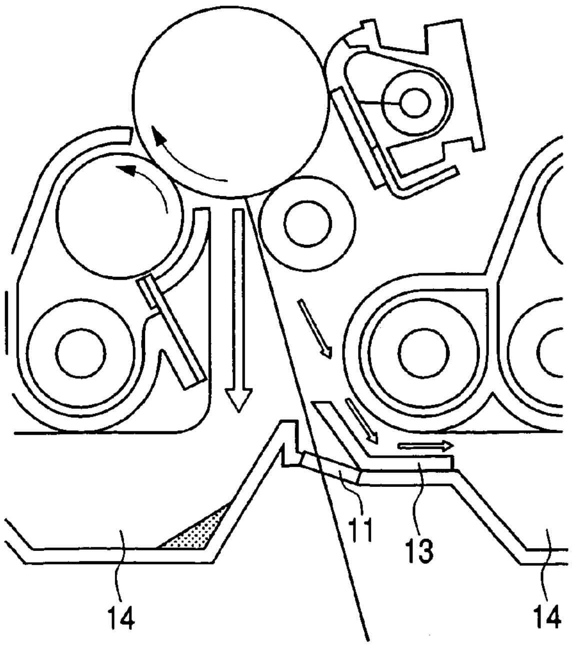
FIG. 4 is a schematic diagram showing an image forming portion in the second embodiment.
Figure 5:
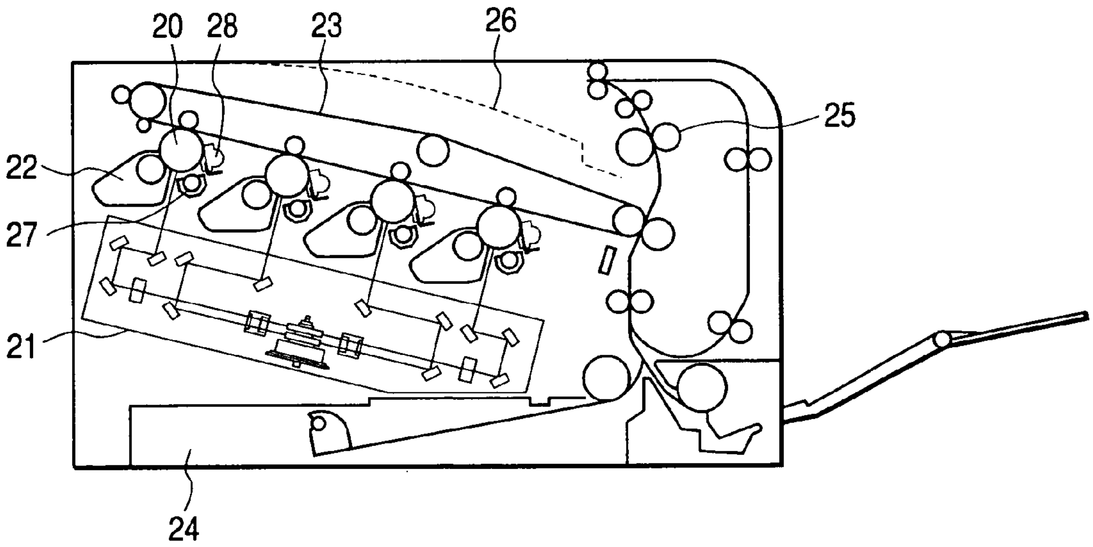
FIG. 5 is a drawing illustrating an image forming apparatus.
Figure 6:
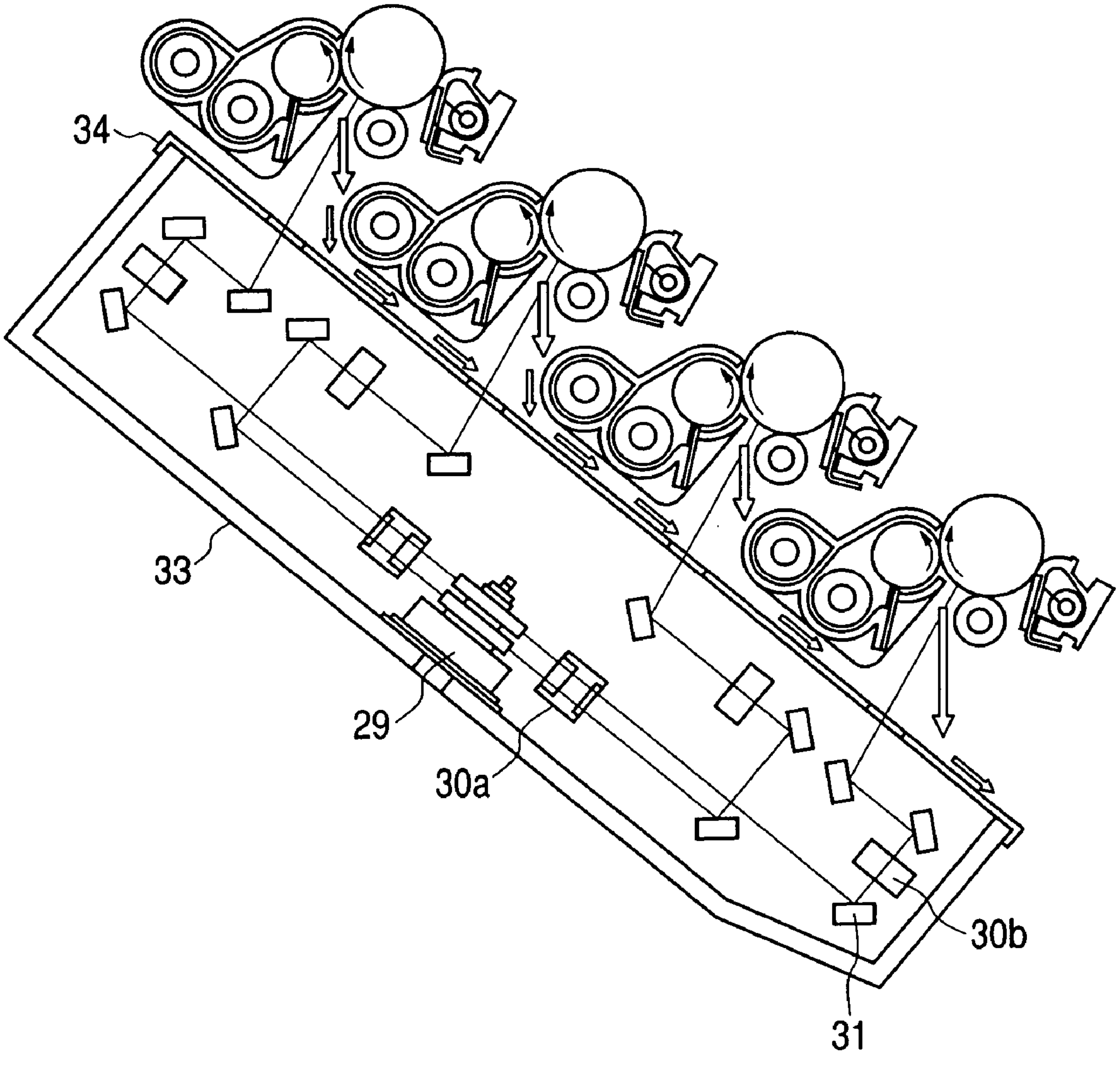
FIG. 6 is a drawing illustrating an image forming apparatus.
Figure 7:
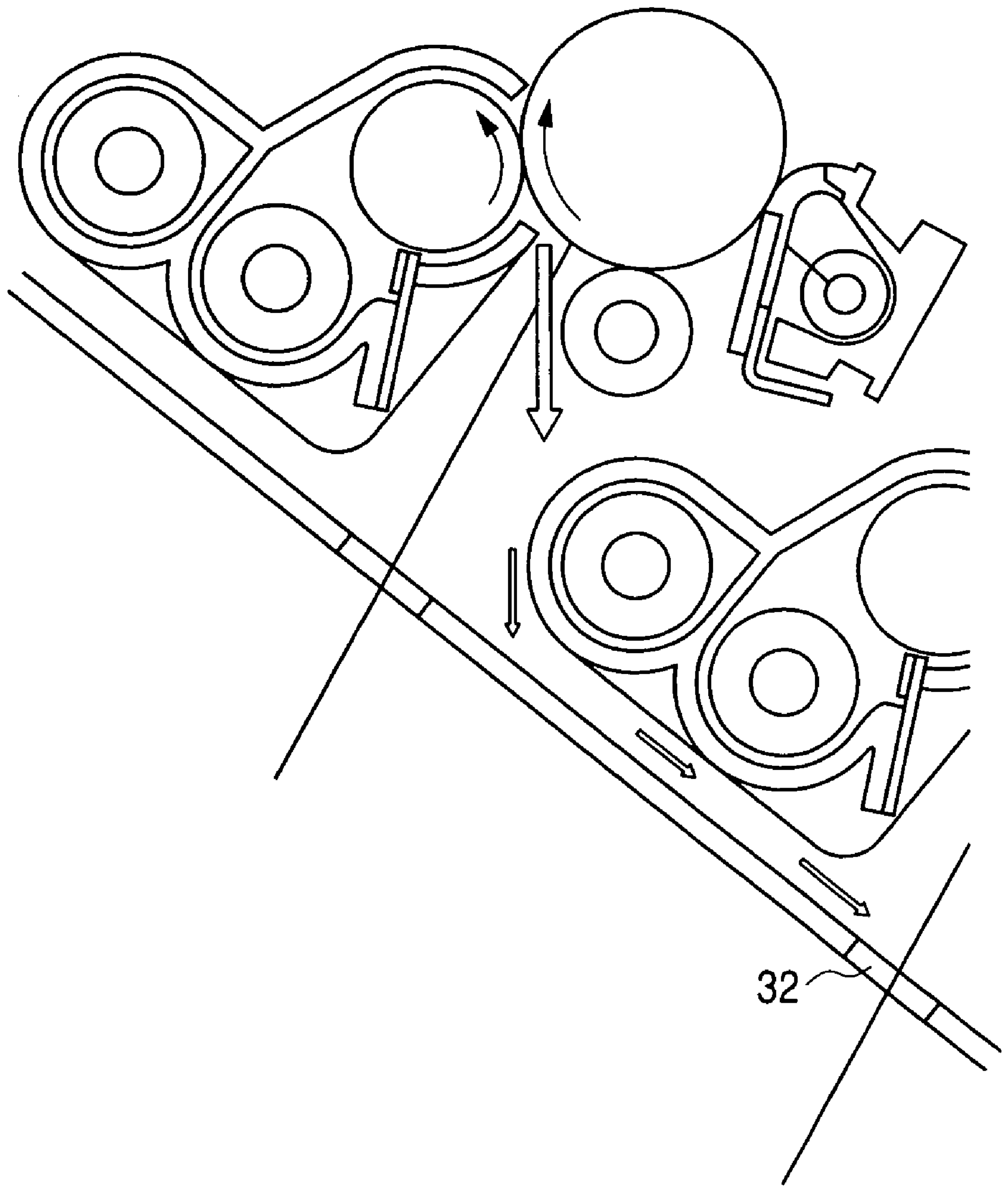
FIG. 7 is a drawing illustrating an image forming apparatus.

As shown in FIG. 4, in the apparatus structure according to this embodiment, falling or scattering toner is brought by the protecting cover 13 that covers the dust-proof glass plate 11 to a toner pool portion 14 located on the right side of the dust-proof glass plate 11. The protecting cover 13 and the sloped portion of the toner pool portion 14 of the optics case top lid forms a shape of an unfolded fan, and the dust-proof glass plate 11 is shielded except for an area including the cross section of the light flux of the laser beam. With these features, it is possible to protect the dust-proof glass plate 11 mostly not only against falling toner but also against scattering or flying toner. With the above-described structure, the dust-proof glass plate 11 is difficult to be contaminated by fallen toner, and therefore image quality would be kept high. In addition, maintenance operations can be omitted or simplified.

As described in the foregoing, according to the present invention, the optical path of the laser beam incident on the image bearing member is arranged outside the space in which toner falls, and a recessed portion that is recessed relative to the dust-proof glass plate is provided at the upper portion of the frame for optical members. With these features, it is possible to prevent the surface of the dust-proof glass plate from being contaminated by scattering or falling toner that would be generated in the course of operations of the apparatus.

The invention claimed is:

1. An image forming apparatus comprising:

a plurality of image forming portions, each image forming portion including a photosensitive member, a charging device for charging said photosensitive member, and a developing device for developing an electrostatic image on said photosensitive member with toner;

an emitting portion disposed beneath said plurality of image forming portions for emitting light beams for exposing said plurality of photosensitive members, said emitting portion including an upper frame portion opposed to said plurality of image forming portions;

a plurality of pass openings, which are provided in said upper frame portion, and through which the light beams pass for exposing said plurality of photosensitive members, wherein each of said plurality of pass openings is disposed outside of areas, wherein each area is between a vertical tangential line, at a downstream side in a rotation direction of said photosensitive member, of said charging device and a vertical tangential line, at an upstream side in the rotation direction of said photosensitive member, of each said developing device in an associated image forming portion; and a recessed portion formed on said upper frame portion in a position different from said plurality of pass openings and disposed in a region between an area and a pass opening.

2. An image forming apparatus according to claim 1, wherein said plurality of image forming portions are arranged along an oblique direction, and said upper frame portion is inclined substantially along the direction along which said plurality of image forming portions are arranged.

3. An image forming apparatus according to claim 1, further comprising a cover for preventing toner from falling onto said pass openings.

4. An image forming apparatus according to claim 1, wherein said pass openings are covered with transmission members through which the light beams are transmitted.

5. An image forming apparatus comprising:

a plurality of image forming portions, each image forming portion including a photosensitive member, a charging device for charging said photosensitive member, and a developing device for developing an electrostatic image on said photosensitive member with toner; and an emitting portion disposed beneath said plurality of image forming portions for emitting light beams for exposing said plurality of photosensitive members, said emitting portion including an upper frame portion opposed to said plurality of image forming portions;

a plurality of pass openings, which are provided in said upper frame portion, and through which the light beams pass for exposing said plurality of photosensitive members; and a recessed portion provided between said plurality of pass openings so as to be opposed to an area being between a vertical tangential line, at a downstream side in a rotation direction of said photosensitive member, of said charging device and a vertical tangential line, at an upstream side in the rotation direction of the photosensitive member, of each said developing device in an associated image forming portion.

* * * * *

UNITED STATES PATENT AND TRADEMARK OFFICE

CERTIFICATE OF CORRECTION

PATENT NO. : 7,173,646 B2
APPLICATION NO. : 10/508796
DATED : February 6, 2007
INVENTOR(S) : Hiroshi Nakahata It is certified that error appears in the above-identified patent and that said Letters Patent is hereby corrected as shown below:

COLUMN 1:
Line 19, "cross sectional" should read --cross-sectional--.
Line 29, "puter etc." should read --puter, etc.,--.
Line 57, "(i.e.," should read --(i.e.,--.
Line 67, "f" should read --fθ--.

COLUMN 2:
Line 9, "image." should read --image may occur.--.
Line 25, "cleaner etc." should read --cleaner, etc.,--.
Line 54, "is" should read --is a--.

COLUMN 3:
Line 36, "drums etc." should read --drums, etc.,--.
Line 38, "(i.e." should read --(i.e.,--.
Line 61, "cleaner 7" should read --cleaner 7,--.

COLUMN 4:
Line 12, "(i.e." should read --(i.e.,--.
Line 37, "drums etc." should read --drums, etc.,--.

Signed and Sealed this

Seventh Day of August, 2007

JON W. DUDAS
*Director of the United States Patent and Trademark Office*